(Model.)
M. G. CARLETON.
STOVE COVER.
No. 250,200. Patented Nov. 29, 1881.
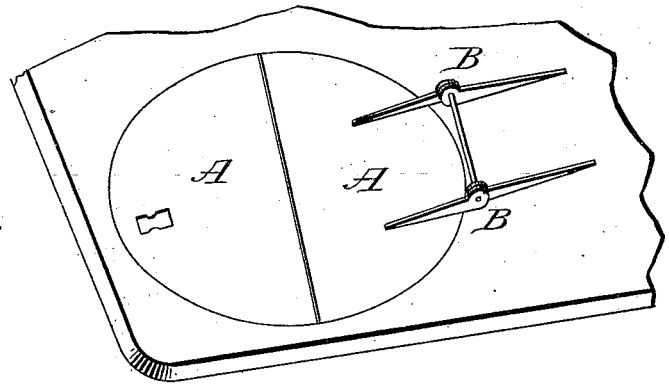
Fig. 1.
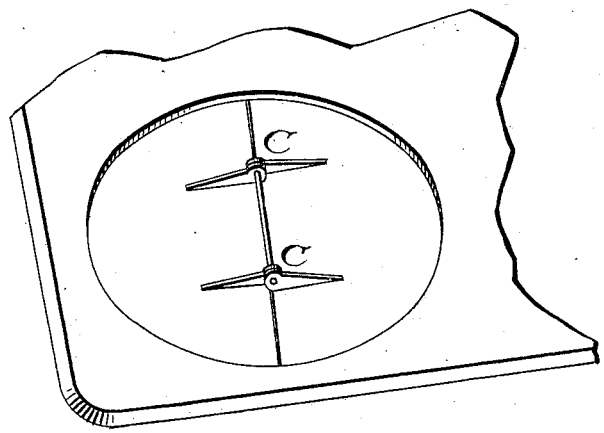
Fig. 2.
Fig. 3.
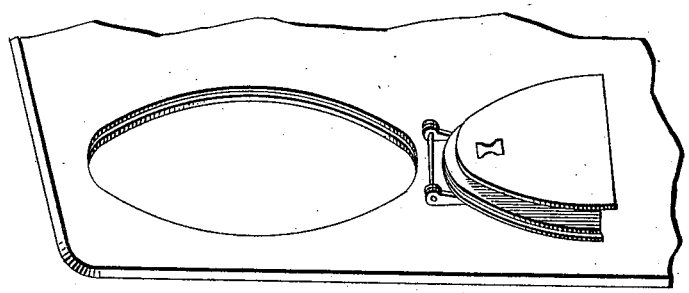
Witnesses:
Inventor:
Monroe G. Carleton

UNITED STATES PATENT OFFICE.

MONROE G. CARLETON, OF JACKSON, MICHIGAN.

STOVE-COVER.

SPECIFICATION forming part of Letters Patent No. 250,200, dated November 29, 1881.

Application filed August 19, 1881. (Model.)

*To all whom it may concern:*

Be it known that I, MONROE G. CARLETON, a citizen of the United States, residing at Jackson, in the county of Jackson and State of Michigan, have invented a new and useful Improvement in Stove-Covers; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to an improvement in lids or covers which close the openings in the top of a stove when not used to receive cooking utensils, its object being to promote convenience by having the lid or cover near by the opening at all times, when uncovered, to lessen liability of the fracture of the lid or cover from the spilling of water or other liquids, to prevent the dropping of the lid or cover in handling, to avoid the deposits of soot from the lid, as when removed from the stove, and to provide for compactness, economizing in space, and imparting tidiness of appearance.

The nature of this invention consists of a lid or cover made in two parts, capable of folding together, one being connected to the stove, substantially as hereinafter more fully set forth and claimed.

In the accompanying drawings, Figure 1 is a perspective view of a portion of a stove-top, showing the upper side of cover. Fig. 2 is a bottom view of said cover. Fig. 3 represents the cover folded back, in order to uncover the hole in the stove.

The cover or lid is made in two parts or halves, A A, capable of being folded together, preferably by means of hinges C, bottom to bottom, in order to prevent the deposits of soot therefrom when removed from over the opening in the stove-top. One section or half is connected by the hinge or hinges B to the stove-top to permit the turning of the folded halves or sections of the lid or cover upon the stove-top.

The point of hinging the lid or cover to the stove-top may be selected with a view of its being turned back out of the way of the vessel occupying the adjoining hole.

From the foregoing it will be observed that the cover or lid will always be at hand when wanted, it being connected to the stove at the point where used; that liability of its fracture from the spilling upon it of liquids is lessened, owing to its reduced area of surface; that possibility of dropping in handling is prevented; that soot-deposits from the cover are avoided when lifted from its place, as the soot-surfaces are folded together, thereby adding to the tidiness of the stove; and that compactness and neatness of appearance are obtained, as the folded cover occupies but one-half the space of the old or undivided cover, and is always in its place and in lifting backward and forward can be handled more conveniently than the old cover.

I am aware that it is old to make a stove-door in two parts hinged together, and to hinge a lid or cover to the stove-top.

I claim and desire to secure by Letters Patent—

The stove lid or cover made in two parts, A A, capable of folding together, one half or part upon the other, and connected to the stove-top and adapted to be turned back thereon, substantially as and for the purpose set forth.

MONROE G. CARLETON.

Witnesses:
J. F. SAMMONS,
S. D. RONDENLUSH.